May 23, 1972     H. T. COBEY     3,664,645
COMPOST AND REFUSE SHREDDING AND SHIFTING APPARATUS
Filed March 30, 1970     2 Sheets-Sheet 1
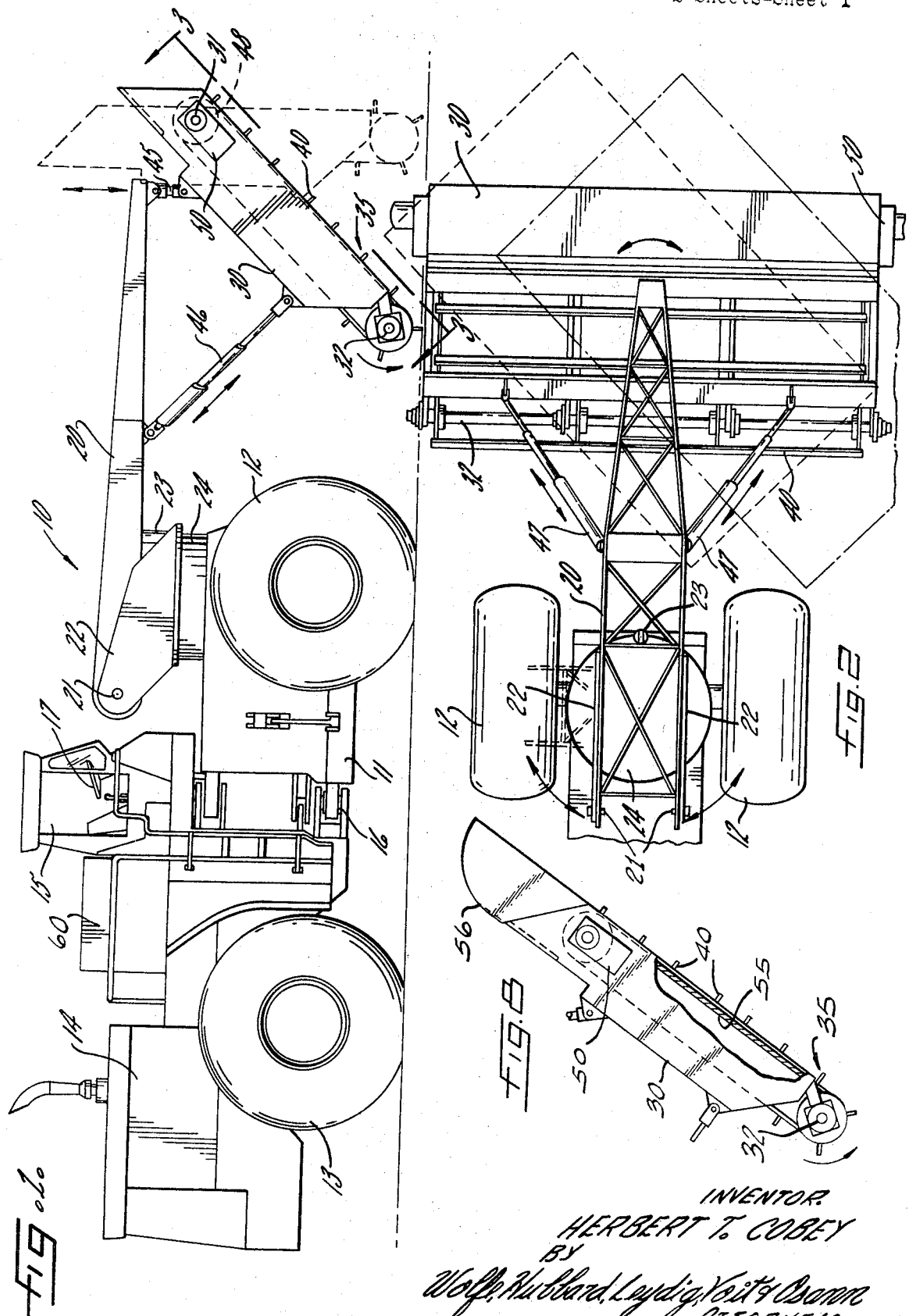
INVENTOR.
HERBERT T. COBEY
BY
Wolfe, Hubbard, Leydig, Voit & Osann
ATTORNEYS.

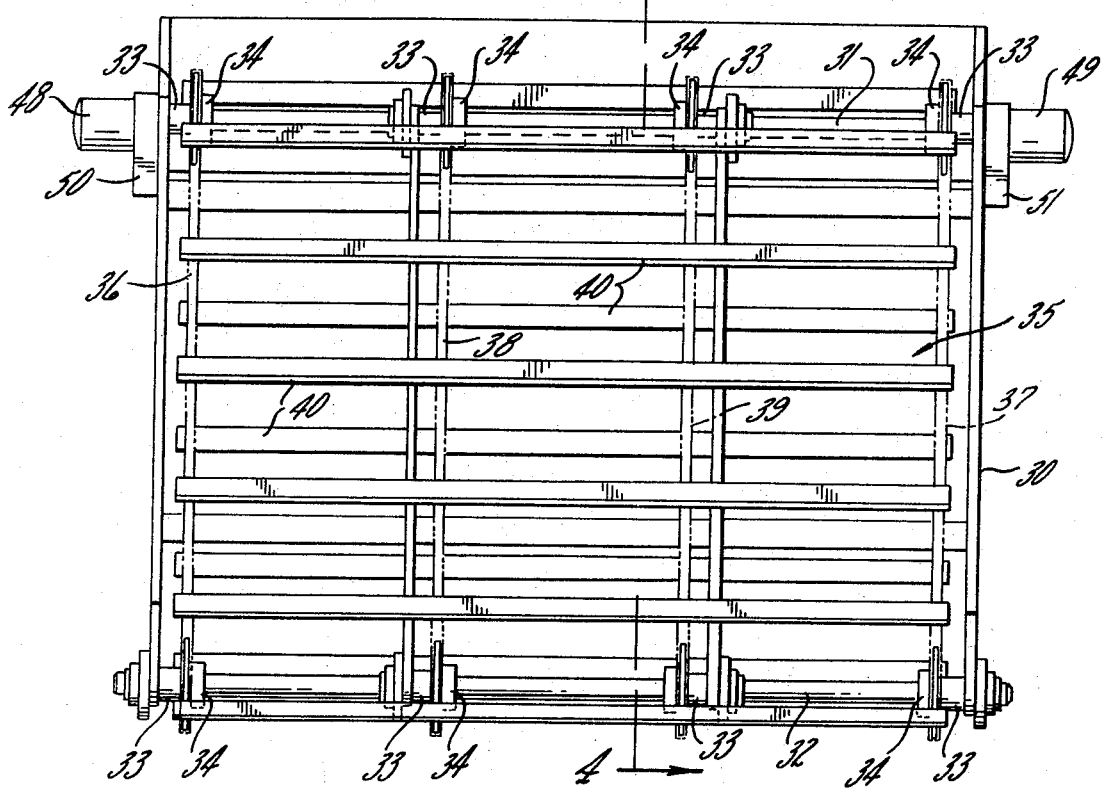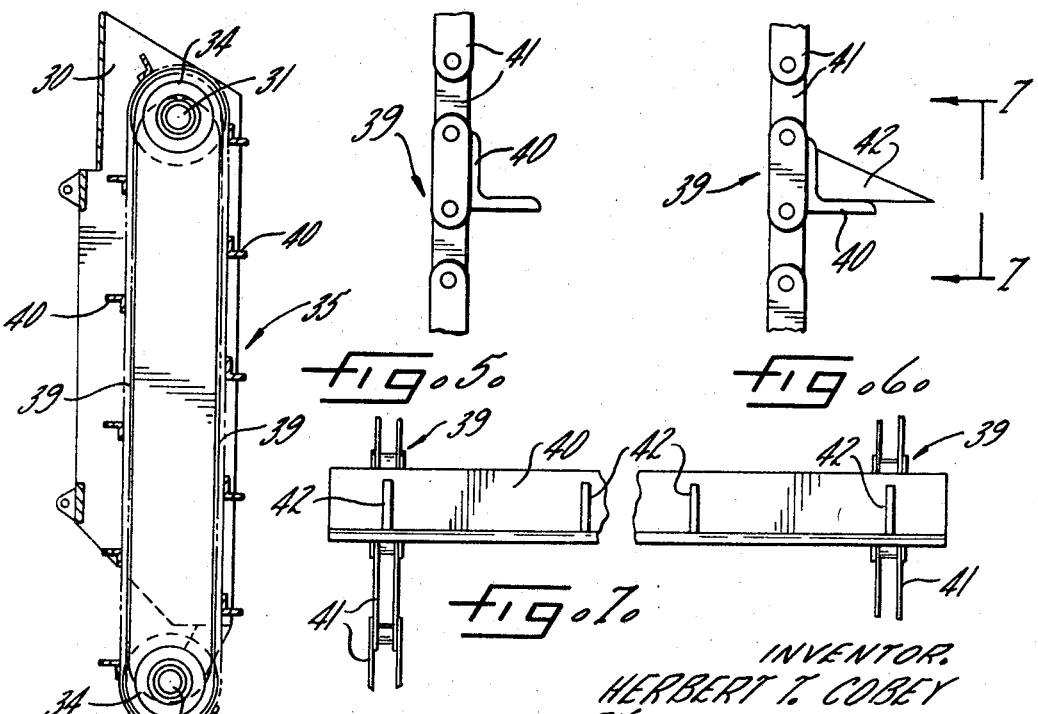

3,664,645
Patented May 23, 1972

3,664,645
COMPOST AND REFUSE SHREDDING AND SHIFTING APPARATUS
Herbert T. Cobey, P.O. Box 313,
Crestline, Ohio 44827
Filed Mar. 30, 1970, Ser. No. 23,566
Int. Cl. B01f
U.S. Cl. 259—183                                       20 Claims

ABSTRACT OF THE DISCLOSURE

An endless web carrying a plurality of outwardly projecting elements is moved in an upwardly and forwardly extending orbital path so that the projecting elements successively shred, shift and aerate organic wastes, refuse and other material as the working face of the web engages the material. In the preferred embodiment the web is supported from a self-propelled chassis and the plane of the web is adjustable relative to both the longitudinal and vertical axes of the chassis.

BACKGROUND OF THE INVENTION

The present invention relates generally to the field of waste disposal and composting, and more particularly concerns apparatus for shredding, shifting and aerating organic wastes, refuse and other materials such as at a municipal dump or landfill in order to promote more rapid composting of the organic material and more efficient compaction of the other material.

It is well known that garbage and municipal refuse, as well as sewage solids and agricultural wastes contain a high content of organic material which, if properly handled, can be converted by bacteria in a composting process into a non-odorous and valuable product for use as a fertilizer or as a landfill material. It is also recognized that although a certain portion of such municipal refuse and other waste materials cannot be readily composted, it can be broken up or shredded to reduce its volume and permit better compaction of this material when it is used as a landfill.

In the past, the various means that have conventionally been utilized to dispose of garbage, refuse and other waste materials have usually involved expensive incineration, sewage treatment or enclosed composting equipment on the one hand or large, unsightly and inefficient refuse dumps on the other hand. More recently, the problem of waste disposal has been more satisfactorily resolved with higher productivity and lower initial and operating costs through the use of rotating drum fragmentizing apparatus of the self-propelled type, as disclosed for example in my U.S. Pat. No. 3,369,797 entitled Compost Turner and Windrow Forming Machine. This patent discloses a toothed drum mounted for rotation about a horizontally disposed axis. However, the mass or mound of waste material which can be satisfactorily processed by the horizontal drum apparatus can have a heighth no greater than the approximate diameter of the drum and the material must be disposed in substantially discrete windrows both before and after each pass of the machine. Since, for practical purposes and from the standpoint of manufacturing cost, such horizontal drums are ordinarily limited in diameter to between 3 feet and 6 feet and since the windows of material are usually spaced apart by at least one wheel width of the machine, there are definite limitations on the quantity of refuse material that can be handled within a given area.

Accordingly, it is the primary aim of the present invention to provide an apparatus for shredding, shifting and aerating organic waste, refuse and other material which can economically and efficiently handle much larger quantities of the material within a given area than was heretofore possible.

It is a more specific object of the present invention to provide an apparatus which does not require that the compost and other refuse material be deposited in the form of windrows before and after the shredding, shifting and aerating thereof by the apparatus of the present invention.

Another object of the invention is to provide a self-propelled apparatus of the above character which, after shredding and aerating the compost and other refuse material lying ahead of the apparatus, shifts the material laterally out of the path of the advancing apparatus.

A more specific object of the invention is to provide an apparatus which is not only capable of the foregoing objects but which is also capable of digging up, mixing and moving new and existing landfill material more efficiently than conventional bulldozer, scraper blade and bucket loading apparatus.

These and other objects and advantages of the invention will become more readily apparent upon reading the following detailed description of an illustrative form of the apparatus and upon reference to the attached drawings. Moreover, while certain preferred forms and embodiments of the apparatus have been illustrated and described in detail, it is not intended to limit the invention to those particular embodiments. Rather, it is intended to cover all such alternative and equivalent embodiments as may properly fall within the scope of the appended claims.

BRIEF DESCRIPTION OF THE DRAWINGS

FIG. 1 is a side elevation of the preferred form of the apparatus embodying the present invention, with alternate vertical positions of the shredding, shifting and aerating mechanism illustrated in full and dash lines;

FIG. 2 is a fragmentary top plan view of the apparatus shown in FIG. 1, again with different positions of the shredding, shifting and aerating mechanism illustrated in full and broken lines;

FIG. 3 is a view of the shredding, shifting and aerating mechanism substantially as seen along line 3—3 in FIG. 1;

FIG. 4 is a section of the mechanism substantially as seen along line 4—4 in FIG. 3;

FIGS. 5 and 6 are enlarged fragmentary illustrations of alternate embodiments of the web of the shredding, shifting and aerating mechanism;

FIG. 7 is a fragmentary view of the web substantially as seen along line 7—7 in FIG. 6 and;

FIG. 8 is a fragmentary side elevation illustrating an optional deflector chute and with portions broken away to show the backing plate in the preferred embodiment.

DETAILED DESCRIPTION OF THE PREFERRED EMBODIMENTS

Turning now to the drawings, there is shown in FIG. 1 an illustrative appartus 10 embodying the present invention. In its preferred form, the apparatus 10 includes a self-propelled chassis 11 supported on front and rear wheels 12 and 13, respectively. The chassis 11 also carries an engine 14 for driving the wheels and an operator's cab in which the controls for operating the engine and steering the wheels are located. As illustrated the chassis 11 is of the articulated type having a vertical pivot 16 adjacent the midpoint thereof for turning the front wheels 12 relative to the rear wheels 13 by means of a steering wheel 17 and a power steering linkage (not shown).

It should be understood that the description thus far is that of a conventional rubber-tired, self-propelled, articulated vehicle and, while this form of vehicle is preferred, other self-propelled vehicles may also be employed with the present invention. Indeed, for some applications a track-type vehicle or a vehicle with a different steering arrangement may actually be desirable.

Mounted on the front end of the chassis 11 and projecting forwardly therefrom is a boom 20. While a single boom is shown it will be appreciated that a pair of laterally spaced boom arms may also be employed if desired. Preferably, the boom 20 is pivotally mounted about a horizontal axis and means are provided for raising and lowering the projecting end of the boom relative to the chassis 11. In the instant embodiment the boom 20 is pivotally mounted on a pin 21 which extends between a pair of laterally spaced support plates 22 and the projecting end of the boom is raised and lowered by means of a hydraulic cylinder 23.

In the illustrated embodiment, the boom 20 is also mounted for swinging movement about a vertical axis and means are provided for swinging the projecting end of the boom to either side of the longitudinal axis of the chassis 11. To this end, the boom support plates 22 are mounted on a turntable structure 24 and means such as a hydraulic motor and ring gear (not shown) are provided for rotating the turntable. The boom elevating cylinder 23 is, of course, located between the rotating portion of the turntable 24 and the boom 20.

In accordance with the present invention, the apparatus 10 is provided with means for shredding, shifting and aerating organic wastes, refuse and other material located ahead of the chassis as it is propelled forwardly. As shown in FIGS. 1 and 2, a frame 30 is supported by the boom 20 ahead of the chassis 11. Within the frame 30 are mounted upper and lower shafts 31 and 32, respectively, journalled in suitable bearings 33 (see also FIG. 3). Each shaft 31, 32 carries a plurality of pulleys or sprockets 34 spaced laterally along its length and a movable endless web, indicated generaly at 35, encircles the sprockets 34 on the upper and lower shafts 31, 32.

The web 35 includes at least a pair of continuous edge loops 36 and 37 and, in the illustrated embodiment, a pair of intermediate loops 38 and 39 interconnected by a plurality of cross bars 40. As shown more clearly in FIG. 5 each of the loops 36–39 in the illustrated embodiment is formed of a plurality of chain links 41 and the cross bars 40 are substantially L-shaped angle bars with one leg secured to the chain loops 36–39 and the other leg projecting outwardly therefrom. It should be understood, however, that the loops 36–39 could be formed of reinforced belts or metal cable and the cross bars could form a continuous sheet of impregnated fabric or wire mesh if desired.

Pursuant to the invention means are provided for orbitally moving the web 35 about the shaft 31, 32 so as to present an upwardly directed working face defined by the projecting legs of the cross bars 40 for shredding, shifting and aerating compost, refuse or other material as the chassis 11 is propelled ahead. To further enhance the cutting and shredding action of the web 35 a plurality of outwardly projecting teeth 42 may be secured to the cross bars 40, to the loops 36, 39 or to the face of the web 35, if it is formed of a continuous material. In the embodiment shown in FIGS. 6 and 7, the teeth 42 are secured, such as by welding, at laterally-spaced locations to the angle iron cross bars 40. Preferably, the teeth 42 on each cross bar 40 are disposed in staggered relation to the teeth on the two adjacent cross bars to further enhance the cutting and shredding action. Also, while the teeth 42 are shown as blade-like cutting elements in the illustrated embodiment it will be understood that the teeth could be formed with a cup-shaped cross-section to perform a scooping or digging function if desired.

In further keeping with the invention, the frame 30 is pivotally connected to the boom 20 for movement between a substantially vertical position and a position wherein the frame is inclined upwardly and forwardly at an angle of about 45°. (See, for example, the solid and dash line positions of the frame 30 as shown in FIG. 1.) Thus, it will be understood that the forward reach of the web 35 presents an upwardly directed working face for engaging the refuse material which is shredded, aerated and thrown upwardly and forwardly of the frame 30.

Preferably, the frame 30 is also pivotally connected to the boom 20 for movement between a position substantially transverse to the longitudinal axis of the chassis and a position wherein the frame is angled about 45° in either direction from the transverse position. (See, for example, the solid and dash line positions of the frame 30 as shown in FIG. 2.)

Moreover, since this transversely angled position of the frame cuts down on its effective width and because the upwardly inclined angle then causes the lower edge of the frame 30 to then be mis-centered relative to the axis of the chassis, the frame may be bodily shifted (as seen in dot-dash lines in FIG. 2) by swinging the boom 20 to center the lower edge of the frame relative to the axis of the chassis 11. It will be observed that with the frame in this position the working face of the web 35 is disposed such that it engages and clears all of the compost and refuse material located ahead of the frame 30 out of the path of the wheels 12, 13 of the chassis 11 as the chassis moves forward. Also, it will be seen that since the material engaged by the web 35 is thrown upwardly, forwardly and to the right (relative to the direction of travel in FIG. 2) the apparatus can make progressive passes across an area covered with compost or other refuse material without necessitating placing or leaving the material in window form prior to or after passage of the apparatus. Thus, with the present apparatus a much larger quantity of material can be handled within a given area.

To permit both the above mentioned vertically inclined and horizontally angled positions of the frame 30, a connection 45 in the form of a universal joint is desirably used to interconnect the projecting end of the boom 20 and the upper portion of the frame 30. A pair of individually controllable double acting hydraulic cylinders 46 and 48 interconnected between an intermediate portion of the boom 20 and points adjacent the lower corners of the frame may be operated to change the angle and inclination of the frame between the positions described above. In addition, the height of the lower edge of the frame 30 may also be adjusted by raising and lowering the boom 20 through the cylinder 23.

Hydraulic power is also preferably utilized to drive the web 35 and in the illustrated embodiment a pair of hydraulic motors 48 and 49 are mounted on the sides of the frame 30 and interconnected to the upper shaft 31 through respective gear reduction units 50 and 51. It will be understood of course that since the motors 48 and 49 are located at opposite ends of the shaft 31, the direction of rotation of one motor must be reversed relative to the other.

It will be further understood, of course, that the motors 48 and 49 as well as the cylinders 23, 46 and 47 are supplied with hydraulic fluid from a hydraulic pump indicated generally at 60 on the chassis 11 through conventional supply and return lines (not shown) under the control of the operator. Moreover, other types of rotary and linear actuators may also be used in place of the illustrated motors and cylinders if desired.

To prevent the compost and refuse material from passing through the open framework of the web 35 defined by the chains 36–39 and cross bars 40 a backing plate 55 (illustrated in FIG. 8) may be provided behind the upwardly moving reach of the web. The backing plate also serves to prevent excessive deflection of the web 35 between the shafts 31 and 32.

In order to provide better control of the direction that the refuse material is discharged from the upwardly moving web 35, a discharge chute or deflector 56 (illustrated in FIG. 8) may be provided at the upper end of the frame 30. Preferably, the chute 56 is adjustable connected to the frame 30 so that the discharge angle can be changed in accordance with the operating conditions encountered.

The use and operation of the apparatus of the present invention should be clear to those skilled in the art from the foregoing detailed description. Accordingly, only a brief summary of the operation will be presented here.

As will be apparent the apparatus 10 has particular utility for shredding, aerating and shifting compost, refuse and other material such as are dumped by trucks at a landfill. Depending upon the depth and composition of the material to be worked upon and the directions of travel and desired discharge, the cylinders 23, 46 and 47 are actuated by the operator to provide the desired height, inclination and angle to the frame 30. Generally, both the vertical inclination and the horizontal angle (to one side or the other) will be selected within the range of 45°–60° and the depth will be such as to move approximately one layer of deposited material. However, under some circumstances, it may be desirable to position the frame 30 in a very nearly vertical or in a nearly transverse position or both to move the material in a specific direction.

When the working face of the web 35 engages the refuse material, the projecting angle bars 40 and teeth 42 dig into the material lifting, cutting and throwing it upwardly, forwardly and to one side or the other of the line of travel of the chassis 11 (depending, of course, on the position of the frame). This serves to shred, aerate, mix and move the material and thereby speeds up the composting of the organic material and the fragmentation of the particulate matter. By repeating this several times at appropriate intervals it will be appreciated that the material is substantially reduced in volume both due to the bacterial action and the elimination of large voids and a much more dense and compact landfill results.

For convenience and ease of operation the foregoing operation is generally performed on a substantially level area although this is not always necessary. Also in many instances, new refuse material may be deposited along one edge of the area and then progressively moved laterally across the area by making successive passes with the apparatus 10 at appropriate time intervals. Finally, the processed material may be pushed or thrown over the edge of the working area and into a ravine or the like that is being filled. In areas where it is required, the apparatus 10 may also be employed to cover newly deposited material with dirt or previously processed material in order to protect the new material from flies and rodents and to cut down on the release of objectionable odors and gases from such materials.

From the foregoing, it will be appreciated that the apparatus 10 of the present invention is a very versatile and efficient apparatus for shredding, shifting and aerating compost and other refuse material and for processing and reconstituting both old and new landfills. Other uses of the apparatus of the present invention will doubtlessly also occur to those skilled in the art and the invention should not be construed as limited to the specific uses and embodiments disclosed and described herein.

I claim as my invention:

1. An apparatus for shifting and aerating organic wastes, refuse and other material comprising, in combination,
   a self-propelled chassis;
   boom means carried on said chassis and projecting forwardly therefrom;
   a frame supported by said boom ahead of said chassis;
   upper and lower parallel shafts carried by said frame with said shafts disposed substantially horizontally, said upper shaft being disposed forwardly of said lower shaft;
   a movable endless web encircling said shafts and carrying a plurality of elements projecting outwardly therefrom;
   and means for orbitally moving said web about said shafts so as to present an upwardly and forwardly directed working face defined by said projecting elements for shifting and aerating said material located ahead of said chassis as said chassis is propelled forwardly.

2. An apparatus as defined in claim 1 wherein said web includes a pair of continuous loops interconnected by a plurality of cross bars.

3. An apparatus as defined in claim 2 wherein said loops are formed of chain links and said cross bars are substantially L-shaped with one leg thereof secured to each of said chains and the other leg thereof defining one of said outwardly projecting elements.

4. An apparatus as defined in claim 2 wherein each of said cross bars carries a plurality of laterally spaced teeth which project outwardly therefrom.

5. An apparatus as defined in claim 4 wherein said teeth on each cross bar are disposed in staggered relation to the teeth on the two adjacent cross bars.

6. An apparatus as defined in claim 1 wherein said frame is pivotally connected to said boom for movement between a substantially vertical position and a position wherein said frame is inclined upwardly and forwardly at an angle of about 45° and means are provided for moving said frame between said vertical and inclined positions.

7. An apparatus as defined in claim 6 wherein said frame moving means includes a pair of hydraulic cylinders interconnecting said boom and said frame.

8. An apparatus as defined in claim 1 wherein said frame is pivotally connected to said boom for movement between a position substantially transverse to the longitudinal axis of said chassis and a position wherein said frame is angled about 45° in either direction from said transverse position and means are provided for moving said frame between said transverse and angled positions.

9. An apparatus as defined in claim 8 wherein said frame moving means includes a pair of hydraulic cylinders interconnecting said boom and said frame.

10. An apparatus as defined in claim 1 wherein said boom is pivotally mounted on said chassis about a horizontal axis and means are provided for raising and lowering the projecting end of said boom and said frame relative to said material.

11. An apparatus as defined in claim 1 wherein said boom is pivotally mounted on said chassis about a vertical axis and means are provided for swinging the projecting end of said boom and said frame to either side of the longitudinal axis of said chassis.

12. Aparatus as defined in claim 1 wherein said means for moving said web includes a hydraulic motor mounted on said frame for driving one of said shafts and hydraulic pump means are provided on said chassis for powering said web motor at a speed independent from the speed at which said chassis moves.

13. Apparatus as defined in claim 12 including a pair of web motors one drivingly connected to each end of the upper one of said shafts.

14. Apparatus as defined in claim 1 wherein said frame includes a substantially flat plate behind the upwardly moving portion of said web.

15. Apparatus as defined in claim 1 including a discharge chute mounted on said frame for directing the discharge of material from said web and away from said chassis.

16. An apparatus as defined in claim 1 wherein said upper and lower shafts are disposed to present said upwardly and forwardly inclined working face at an angle of between about 45° and 60° relative to the vertical.

17. An apparatus as defined in claim 1 wherein said upper and lower shafts are disposed at an acute angle relative to the longitudinal axis of said chassis.

18. An apparatus as defined in claim 17 wherein said acute angle is about 45°.

19. A refuse and organic waste shifting and aerating apparatus for attachment to a self-propelled vehicle, having longitudinal and transverse axis, comprising in combination:
   a frame;

a pair of parallel shafts journalled by bearings carried by said frame;

a movable endless web encircling said shafts and carrying a plurality of elements projecting outwardly therefrom;

means for orbitally moving said web about said shafts to present a moving working face defined by said outwardly projecting elements;

and means for connecting said frame to said vehicle with said working face inclined upwardly and forwardly with respect to said longitudinal axis of said vehicle.

20. An apparatus as defined in claim 19 wherein said connecting means also orients said working face at an acute angle with respect to said transverse axis of said vehicle.

References Cited

UNITED STATES PATENTS

| | | | |
|---|---|---|---|
| 2,916,135 | 12/1959 | Likens, Jr. | 37—8 X |
| 3,466,765 | 9/1969 | Bernotas et al. | 37—8 |
| 3,343,286 | 9/1967 | Ray, Jr. et al. | 37—8 |
| 3,369,797 | 2/1968 | Cobey | 259—183 X |

WALTER A. SCHEEL, Primary Examiner

A. I. CANTOR, Assistant Examiner

U.S. Cl. X.R.

23—259.1; 241—101 M